United States Patent
Wells

[11] 3,772,013
[45] Nov. 13, 1973

[54] PHOTOELECTROPHORETIC IMAGING PROCESS EMPLOYING ELECTRICALLY PHOTOSENSITIVE PARTICLES AND INERT PARTICLES

[75] Inventor: John B. Wells, Rochester, N.Y.

[73] Assignee: Xerox Corporation, Stamford, Conn.

[22] Filed: Jan. 6, 1971

[21] Appl. No.: 104,388

[52] U.S. Cl. .................. 96/1.3, 96/1 PE, 96/1.2, 96/1.5, 204/181 PE
[51] Int. Cl. .................. G03g 13/00, G03g 5/00
[58] Field of Search .................. 96/1.3, 1.2, 1 PE; 204/181 PE

[56] References Cited
UNITED STATES PATENTS

| | | |
|---|---|---|
| 3,666,472 | 5/1972 | Fill et al. .................. 96/1.2 X |
| 3,384,565 | 5/1968 | Fulagin et al. .................. 204/181 |
| 3,140,175 | 7/1964 | Kaprelian .................. 96/1.2 X |

Primary Examiner—Norman G. Torchin
Assistant Examiner—John R. Miller, Jr.
Attorney—James J. Ralabate, David C. Petre and Richard A. Tomlin

[57] ABSTRACT

A photoelectrophoretic imaging system wherein an imaging suspension made up of electrically photosensitive particles and inert particles dispersed in an insulating carrier liquid are exposed to a light image and a uniform electrical field. An image is formed by particle migration in image configuration. Either the electrically photosensitive particles or the inert particles migrate to form an image depending on the polarity of the field applied.

28 Claims, 9 Drawing Figures

PATENTED NOV 13 1973 3,772,013

INVENTOR.
JOHN B. WELLS
BY
*Richard A. Tomlin*
ATTORNEY

PHOTOELECTROPHORETIC IMAGING PROCESS EMPLOYING ELECTRICALLY PHOTOSENSITIVE PARTICLES AND INERT PARTICLES

BACKGROUND OF THE INVENTION

This invention relates in general to imaging systems. More specifically, the invention concerns a photoelectrophoretic imaging system.

There has been recently developed a photoelectrophoretic imaging system capable of producing monochromatic or polychromatic images which utilize electrically photosensitive particles. This process is described and claimed in U. S. Patent Nos. 3,383,993 to Yeh; 3,384,565 to V. Tulagin and L. Carreira; 3,384,566 to H. E. Clark and 3,384,488 to V. Tulagin and L. Carreira all issued May 21, 1968. In a preferred embodiment of the process described in those patents, electrically photosensitive pigment particles are dispersed in an insulating carrier liquid providing an imaging suspension. The imaging suspension is placed between a transparent conductive electrode rferred to as the "injecting" electrode and an electrode having an insulating outer surface referred to as the "blocking" electrode. A field is applied across the imaging suspension and the suspension is exposed to an image of electromagnetic radiation to which the particles are sensitive. As these steps are completed, selective particle migration takes place in image configuration providing a visible image normally on both electrodes. The particles apparently undergo a net change in charge polarity upon exposure to activating electromagnetic radiation when brought into interaction range with the injecting electrode. The particles accept the charge of the infecting electrode and are repelled by it migrating to the blocking electrode leaving behind a positive image on the surface of the injecting electrode and forming a complementary negative image on the blocking electrode surface. The particles which move to the blocking electrode are less able to exchange charge with the insulating surface of the blocking electrode and do not cycle within the system. The insulating surface also aids in supporting the relatively high fields used in the process.

To provide monochromatic images, the particles may be of one color, however, particles of more than one color may be used where desired as long as the particles respond to the radiation used. For forming images of more than one color, two or more differently colored particles are used each being sensitive mainly to radiation in separate wavelengths with relatively little overlapping response and approximately equal photosensitivity.

The critical component in the above process is the particles which must be highly electrically photosensitive, must have intense and pure colors and have the proper electrical characteristics. Finding particles with the above combination of characteristics is a continuing problem and seriously limits the materials which can be used and the uses to which the final image may be applied.

An additional complication is that usually the particles used are bare pigments which are not readily fixed permanently to a substrate by the conventional heat fusing or solvent fusing techniques. Although it is possible to coat the pigment materials with a layer of a material which will heat or solvent soften, the coating material may interfere with the photoelectric properties of the pigment and also complicates the pigment manufacturing process.

SUMMARY OF THE INVENTION

It is an object of this invention to provide a photoelectrophoretic imaging system which overcomes the above noted disadvantages.

It is another object of this invention to provide a photoelectrophoretic imaging system which does not require an imaging particle having both high photosensitivity and excellent color.

It is another object of this invention to provide a photoelectrophoretic imaging system in which images may be formed from a very wide range of materials.

It is another object of this invention to provide a photoelectrophoretic imaging system capable of producing patterns of ferromagnetic particles.

It is another object of this invention to provide a photoelectrophoretic imaging system capable of producing patterns of fluorescent materials.

It is another object of this invention to provide a photoelectrophoretic imaging system capable of producing spirit masters.

It is another object of this invention to provide a photoelectrophoretic imaging system capable of producing lithographic masters.

It is another object of this invention to provide a photoelectrophoretic imaging system capable of producing high quality full color images.

It is another object of this invention to provide an imaging system which requires a relatively small amount of photosensitive materials.

The above objects and others are accomplished in accordance with this invention by providing a photoelectrophoretic imaging system in which an imaging suspension comprising a mixture of electrically photosensitive particles and inert particles dispersed in a carrier liquid is placed in an electrical field between electrodes and exposed to imagewise electromagnetic radiation. While the above steps are being completed, images are formed by particle migration on both electrodes. The images are formed by the migration of the photosensitive particles and migration of the inert particles as explained further herein. In a preferred embodiment, the electrical field is applied across the imaging suspension between a transparent conductive injecting electrode and a roller blocking electrode having an insulating layer thereon. The imaging suspension in the preferred embodiment is exposed to imagewise radiation through the transparent electrode while the blocking electrode traverses the imaging suspension with field applied between the electrodes. Depending on the sign of the injecting electrode, either the photosensitive particles or the inert particles are caused to form an image on the blocking electrode, an image of opposite sense is formed on the opposing electrode made up of the remaining particles. Where the inert particles are of a different color than the electrically photosensitive particles, the color of the image formed on either of the electrodes can thus be changed by simply reversing system polarities with little, if any, decrease in system response.

It is entirely unexpected that an image made up of inert particles may be formed. Since the inert particles are by definition not sensitive to the imagewise radiation used, the particles should not be expected to be affected in any manner. When the inert particles are suspended alone and illuminated, no response is obtained. The addition of even relatively small amounts of electrically photosensitive particles, however, causes the inert particles to migrate in image formation. It is speculated that the photosensitive particles exposed to radiation to which they are sensitive in some manner cause the inert particles to change their sign of charge and respond to field application.

The main benefits of this invention derive from the formation of images of photoelectrically inert particles since virtually any material may be used as the inert particles, including conductive, semiconductive and insulating materials. Since the properties of photosensitive response and color are not required in the same particle, the inert particle may be chosen on the basis of color without regard to its photosensitivity, and the electrically photosensitive particle may be chosen for its photoresponse without regard to its color greatly expanding the materials which may be used in photoelectrophoretic imaging. The inert particle, for example, may be made of brilliantly dyed thermoplastic materials which are readily fixed by heat or solvent. They may be fluorescent particles, reflective glass beads or magnetic particles. The use of magnetic particles provides a method for converting a light image directly into a computer readable image. Further, the system can be used for preparing masters for printing. The images can be used as masks for graphic arts processes. The substrate behind an unfused image could be bleached to form a permanent image. The unfused image can be formed on a diazo substrate for forming a diazo image. The image can be used as a heat receptor for thermographic images. The particles can be selected to be inert to acids or solvents, the image serving as a resist when transferred to glass or metal for selective etching. The images can be foamed or built up for Braille use. By using methyl uiolet particles, Ditto masters may be formed.

Since the inert particles may comprise for example, brilliantly colored thermoplastic materials, high quality full color images may be produced by transferring three or more monochrome images formed in this process to a common substrate in register and fused thereon by a single heating step. Alternatively, the monochrome images may be formed on transparencies and overlayed to provide full color images.

The photosensitive particles used to drive the inert particles in this process may comprise any suitable electrically photosensitive particles known from the photoelectrophoresis art. Typical materials include finely divided particles such as those listed in U. S. Pat. Nos. 3,384,488 issued May 21, 1968 to V. Tulagin and L. Carreira, the disclosure of which is incorporated herein by reference. Typical particles include organic pigments such as quinacridones, carboxamides, carboxanalides, triazines, benzopyrocolines, anthraquinones, azos, pyrenes, phthalocyanines both metal containing and metal-free and inorganic materials such as cadmium sulfide, cadmium sulfoselenide, zinc oxide, zinc sulfide, sulphur, selenium, mercuric sulfide, lead oxide, lead sulfide, cadmium selenide, titanium dioxide, indium trioxide and mixtures thereof. The particles may comprise more than one component and may be dye sensitized to alter their spectral response. The "X"-form of metal-free phthalocyanine as shown in U. S. Pat. No. 3,357,989 to J. F. Byrne et al, is preferred because of its high response.

The inert particles may comprise conductive, semiconductive and insulating materials and may themselves be electrically photosensitive. Where an electrically photosensitive material is used as the inert material to insure complete separation of the photosensitive material from the inert photosensitive material, the inert material should have a response about one-tenth or less that of the response of the photosensitive material. That is, it should require at least ten times as much exposure to the radiation used to migrate. The term "electrically photosensitive" for the purposes of this application refers to that property of a particle which will in an electrical field cause it to move away from an electrode when exposed to radiation to which it is sensitive, but will remain on or near the electrode when not so exposed. The term "inert particles" refers to those particles which will not, when suspended alone, respond significantly to the levels of radiation used.

Where it is desired to use conductive materials or materials having relatively high surface conductivity as the inert particle, the materials are coated with a material having a bulk resistivity of at least about $10^3$ ohm cm and preferably $10^5$ ohm cm or greater so as to be able to retain their charge when in contact with a conductive electrode held at a relatively high potential. The preferred inert particle, therefore, have a surface made up of a material which has a bulk resistivity of at least $10^5$ ohm cm. To form permanent color images, dyed thermoplastic materials are preferred because they provide high color brilliance, a wide range of colors and are readily fixed.

It is desirable to use particles which are relatively small in size because smaller particles produce more stable suspensions with the carrier liquid and are capable of producing images of higher resolution than would be possible with particles of larger sizes. Thus, both the photoresponsive and the inert particles should be less than five microns in size with 0.5 to 5 microns being preferred although particles of up to fifteen microns may readily be used. Larger particle sizes tend to form less stable suspensions and cause loss of resolution. The carrier liquid may comprise any suitable insulating material which may be liquid or a solid which may be converted to a liquid at the time of particle migration. Typical insulating materials include decane, dodecane, N-tetradecane, kerosene, molten paraffin, molten beeswax or other molten thermoplastic material, mineral oil, silicone oils such as dimethyl polysiloxane and fluorinated hydrocarbons.

The concentration of photosensitive and inert particles dispersed in the suspension may vary over a surprisingly wide range. The photosensitive particle content can range from about 0.3 to about 25 parts by weight based on 100 parts by weight carrier liquid. The inert particles can comprise from about 1 to about 50 parts by weight based on 100 parts by weight carrier liquid. The range permissible will vary depending on how stable the suspension can be made, the sensitivity of the photosensitive ingredient, the operating conditions and other factors.

It is also possible to provide the imaging suspension in the form of a solid layer which is converted to a liquid suspension at or prior to the time of imaging by application of heat or solvent. Such layers may be formed by dispersing inert and photoresponsive particles in a resin solution, coating the solution on a substrate and allowing the solvent to evaporate. Suitable resins include materials such as Piccotex 75 and 100 (vinyl toluene copolymer), which are resins available from Pennsylvania Industrial Chemical Co., Staybelite Esters 5 and 10 glycerol ester of hydrogenated rosin available from Hercules Powder Co., Amberol ST-137-X a phenolformaldehyde resin available from Rohm and Haas, eicosane, ceresin and similar organic waxes. Typical solvents for these binders include those listed above as carrier liquids.

Although most of the above description has been directed to the formation of monochrome images and the formation of polychrome images by combining monochrome images in registration, it is possible to provide a full color image in one step. This is accomplished by providing a mosaic of, for example, yellow, magenta and cyan dots on a substrate. The dots are each made up of a mixture of photosensitive particles and inert colorant particles in a solid binder. At the time of imaging, the binder is dissolved or melted to form the carrier liquid. The photosensitive ingredient is selected for each dot so that its spectral response does not overlap to a significant degree the spectral response of the other dots, which provides color separation. For example, assume an area containing yellow, magenta and cyan dots is exposed to red light. The photosensitive material in the cyan particle is primarily responsive to red light causing the cyan colorant to move to the image receiving surface. Since the cyan coloration in the original full color image is represented as a red or magenta in a negative color transparency, it can be seen that the cyan has been reproduced. In the same manner, yellow and magenta are reproduced. A full color negative image is thus converted directly into a full color positive image. To make a positive color reproduction of a positive color print, two steps are required. The first step is to expose the suspension as described above, which in this case moves the unwanted particles to the blocking or receiving member. By repeating the roller traverse using a second roller electrode or cleaned first electrode and flood illumination with white light, the desired image may be transferred providing a full color image.

Further flexibility may be obtained by introducing an additional process step. After formation of a first inert particle image, there remains on the injecting electrode areas having relatively little inert particle content and areas containing the original amount of inert particles. By flood illuminating the remaining inert particles may be transferred providing a positive image on the blocking electrode or any other suitable surface. Therefore, by using, for example, a positive input both a negative and a positive image may be obtained.

BRIEF DESCRIPTION OF THE DRAWINGS

The advantages of this improved method of photoelectrophoretic imaging will become apparent upon consideration of the detailed disclosure of this invention, especially when taken in conjunction with the accompanying drawings wherein.

The sizes and shapes of the drawings should not be considered as actual sizes or even proportional to actual sizes because many of the elements have been purposely distorted in size or shape in order to more fully and clearly describe the invention.

Figure 1:
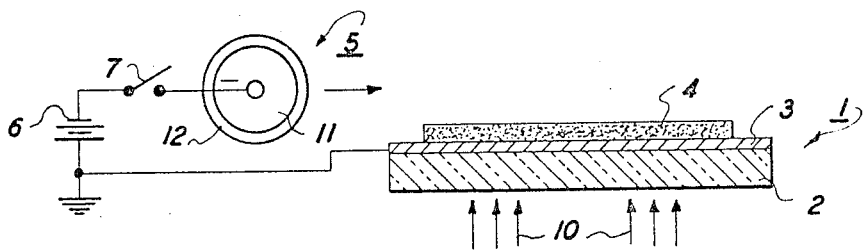
FIG. 1 is a side sectional view of a simple exemplary photoelectrophoretic imaging system in accordance with this invention.

Referring now to FIG. 1, there is seen a transparent conductive electrode generally designated 1, which in this exemplary instance is made up of optically transparent glass 2 overcoated with a thin optically transparent layer 3 of tin oxide. Such electrodes are available commercially e.g. from the Pittsburgh Plate Glass Co. under the name NESA glass. There is no requirement that the conductive surface of this electrode be in immediate contact with the imaging suspension. For example, an insulating film such as polyethylene terephthalate may be placed over the electrode and the system is still operative. Also, this electrode may be in drum, web, roller or other configuration.

On the surface of electrode 1, there is coated a layer 4 of finely divided electrically photosensitive particles and inert particles in an insulating carrier liquid. To apply field across the imaging suspension 4, a second electrode generally designated 5 is used. Electrode 5 here shown as a roller having a conductive center core 11 connected through switch 7 to source of potential difference 6. The opposite side of potential source 6 is connected to conductive surface 3 and to ground. Roller 5 has a resilient insulating outer layer 12. However, there is no requirement that electrode 5 be a roller. Electrode 5 may be a continuous web, drum, flat plate or other suitable shape. It is also not necessary that roller 5 have an insulating outer layer, but an insulating surface is preferred to minimize charge exchange which could cause undesirable back migration of particles arriving at its surface, as well as to help support the relatively large fields used in this process. For example, with the electrodes virtually pressed together in the apparatus as shown, fields of typically about 300 volts per mil are impressed across the imaging suspension. Preferred voltages range from at least about 2,500 to 10,000 volts in the apparatus as described herein.

In operation, the imaging suspension 4 is exposed to a pattern of radiation 10, while roller 5 is caused to traverse suspension 4, with swtich 7 closed. The combination of radiation 10 and field causes either the inert particles or the photosensitive particles to migrate to roller 5 the migration determined by the sign of the potential on electrode 5. The image may be fixed in place or transferred to another member as desired.

Figure 2A:
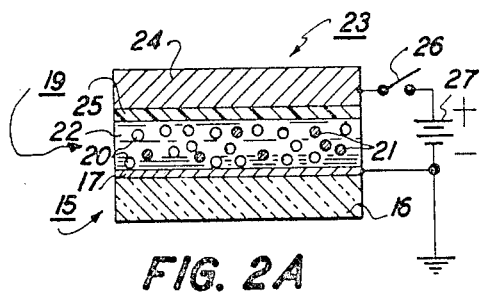
FIGS. 2A–D are diagrammatic representations of the process steps and particle responses which are believed to occur in this system during production of inert particle images.

Referring now to FIG. 2A, there is shown transparent conductive member generally designated 15 which in this exemplary instance is made up of glass 16 overcoated with transparent conductive material 17. On electrode 15 there is coated an imaging suspension generally designated 19 which comprises inert particles 20 and electrically photosensitive particles 21 dispersed in an insulating carrier liquid 22. The particles are relatively uniformly dispersed throughout the liquid. A second electrode generally designated 23, which comprises electrically conductive member 24 having an insulating film 25 on its surface, is placed in contact with suspension 19.

Figure 2B:
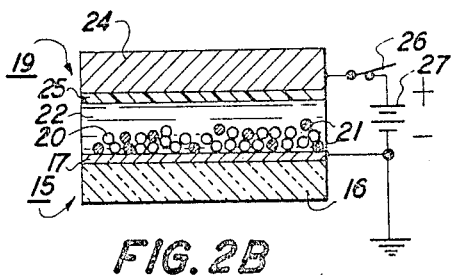

Referring now to FIG. 2B, switch 26 has been closed creating a potential difference across suspension 19 between electrodes 23 and 15. Particles 20 and 21 in suspension 19 are drawn to surface 17 of electrode 15. The particles are caused to move to surface 17 by the field. This mechanism can best be shown by referring back to FIG. 1. As roller 5 is rolled across the surface of suspension 4, an area of high corona exists just ahead of the nip formed by roller 5 and suspension 4. This corona charges at least a portion of the particles in suspension 4 to the same polarity as roller 5 causing them to be drawn to the oppositely charged injecting electrode.

Figure 2C:
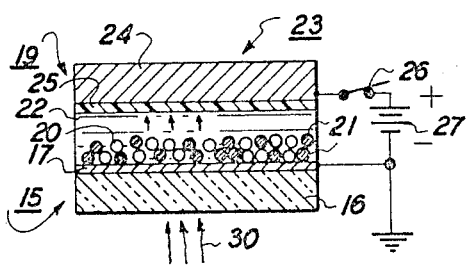
Figure 2D:
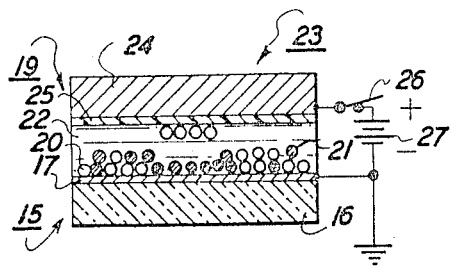

Referring now to FIG. 2C, particles 20 and 21 are exposed to activating electromagnetic radiation 30 in image configuration. Alternatively, electrode 23 can be made transparent and exposure made through it. There is no requirement that switch 26 be closed during the exposure step. For example, a free surface of imaging suspension 19 may be charged to a high potential by a corona discharge providing the field. In this case the field applied during exposure may be reduced to from 500 to 1,500 volts. Also, exposure may occur prior to filed application when particles having a memory effect are utilized. See copending application Ser. No. 675,864 filed Oct. 17, 1967, now U.S. Pat. No. 3,595,770, for a detailed discussion of this process. When particles 21 are exposed to radiation 30 to which they are sensitive, particles 20 are caused to migrate to electrode 23 in light struck areas by a mechanism not fully understood. A negative image of inert particles 20 conforming to the original is formed on surface 25. A complementary image is also formed on surface 17 resulting from the removal of inert particles in light struck areas. This image is formed by the contrast resulting between areas having primarily only photosensitive particles remaining and areas having the original mixture of photosensitive particles and inert particles. Either image may be fixed in place or transferred. Where layer 25 is, for example, paper it may be removed and the image fused thereon.

Figure 3A:
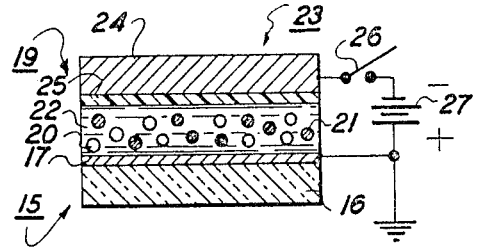
FIGS. 3A–D are diagrammatic representations of the process steps and particle responses which are believed to occur in this system during production of photosensitive particle images.
Figure 3B:
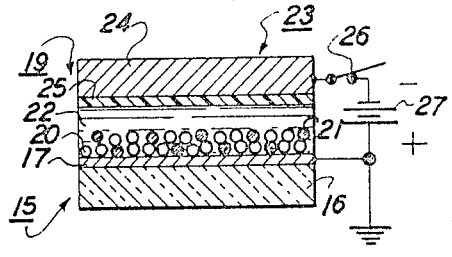

Referring now to FIGS. 3A and 3B, the sequence of steps is identical to FIGS. 2A and 2B with the exception that the sign of the potential 27 is reversed. Where an additional source of corona is used to force the particles to surface 17, a negative corona is used.

Figure 3C:
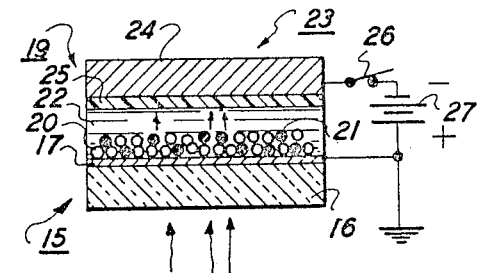
Figure 3D:
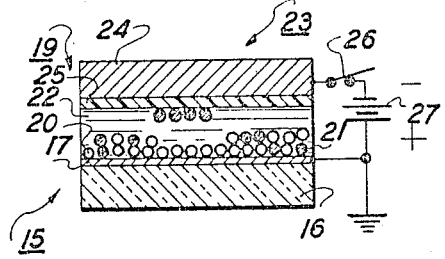

Referring now to FIG. 3C, exposure to radiation 30 to which particles 21 are sensitive causes the photosensitive particles 21 to migrate to electrode 23 in image configuration providing a negative image. Again, a complementary image is formed on surface 17 (FIG. 3D). It can thus be seen that by simply changing the sign of the potential 27 applied to electrodes 15 and 23 an image made up of migrated inert particles 20 or migrated photosensitive particles 21 can be made. Also, if the sign of the field applied is reversed during roller traverse, it is possible to provide an image of one color corresponding to the area traversed by the roller held at the first sign and the remainder of the image being a second color corresponding to the area traversed by roller 5 at the second potential.

DESCRIPTION OF THE PREFERRED EMBODIMENTS

The following Examples further specifically illustrate the improved photoelectrophoretic imaging system provided by this invention. Parts and percentages are by weight unless otherwise indicated. The following Examples are intended to illustrate various preferred embodiments of the present invention. All of the Examples are carried out in an apparatus of the general type illustrated in FIG. 1. A 500 watt quartz iodine light source is used to illuminate a black and white negative transparency, the image being projected by a lens through the injecting electrode which is a tin oxide coated glass. The imaging suspension is formed by dispersing finely divided particles of electrically photosensitive pigments and inert particles in Sohio Odorless Solvent 3454 and milling the suspension until most of the particles are less than about one micron in cross section and are stably co-suspended.

A source of high potential is connected to the blocking electrode core which is a conductive steel roller about 2 inches in diameter. A 3/16 inch thick polyurethane layer is bonded to the steel roller to form the blocking layer. A paper sheet is placed over the polyurethane layer to receive images. The other lead of the source of high potential is connected to the tin oxide surface of the injection electrode and to ground. The imaging suspension is coated on to the injecting electrode to a thickness of about 5 microns. The roller electrode is rolled across the imaging suspension at a rate of about two inches per second with field applied while the suspension is exposed to the negative image. Illumination is about 20 foot-candles unless otherwise indicated.

On completion of roller traverse, a positive image is found adhering to the paper blocking electrode surface.

EXAMPLE I

An imaging suspension is prepared by milling about one part by weight of the electrically photosensitive ingredient "X"-form of metal-free phthalocyanine and about 12 parts by weight of the inert ingredient a magenta dyed melamine formaldehyde resin available as Radiant Color Magenta P6000-G from the Radiant Color Division of Hercules Inc. in 40 parts by weight of Sohio Odorless Solvent 3454.

The suspension is coated on the injecting electrode and imaged using a negative image as described above using an applied potential of about 7,000 volts with the blocking electrode being positive with respect to the transparent conductive injecting electrode. On completion of roller traverse, a dense magenta positive image having a Dmax of 1.4 and a Dmin of 0.00 made up of migrated inert particles is found adhering to the paper blocking electrode surface corresponding to illuminated areas. A complementary image is observed on the injecting electrode surface formed by the removal of magenta particles from the exposed areas of the suspension. This image appears as a blue-green image on a dark magenta background. When viewed by long-wavelength U.V. (a black light lamp), the magenta images are brilliantly fluorescent.

EXAMPLE II

The experiment of Example I is repeated except that the blocking electrode is made negative with respect to the injecting electrode. On completion of roller traverse, a positive image is again found adhering to the paper sheet. Here, however, the image is made up of the blue-green photosensitive phthalocyanine. The image has a Dmax of 0.4 and a Dmin o 0.02. The complementary image on the injecting electrode surface formed by the removal of cyan particles from the exposed areas of the suspension is magenta on a dark magenta background.

EXAMPLE III

The experiment of Example I is repeated. After formation of the first image, the negative transparency is removed from the system. A second blocking electrode again held at about a positive 7,000 volts is rolled across the suspension remaining on the Nesa glass surface while the suspension is exposed to uniform illumination. A dense highly fluorescent magenta negative image of inert particles corresponding to the original negative image input is found adhering to the blocking electrode surface. This image is made up of inert particles which remained on the Nesa glass surface in dark areas during the initial image forming step but were transferred during flood illumination.

EXAMPLE IV

The experiment of Example I is repeated except that in this Example the inert particles are Strong Lemon Yellow B2141 a yellow dyed melamine formaldehyde resin available from Lawter Chemical Inc. The Sohio 3454 is replaced by Sohio 3440 a mixture of kerosene fractions available from Standard Oil of Ohio. The potential applied is 2,500 volts with the blocking electrode being positive. A highly fluorescent dense yellow positive image having a Dmax of 0.83 and a Dmin of 0.0 is formed of the inert particles on the blocking electrode leaving a cyan on green image behind on the injecting electrode.

EXAMPLE V

The experiment of Example IV is repeated except that the blocking electrode is held at a negative 2,500 volts with respect to the NESA glass surface. On completion of roller traverse, a positive cyan image made up of the photosensitive particles is found adhering to the blocking electrode paper surface. A yellow image on a green background is left on the NESA glass.

EXAMPLE VI

The experiment of Example IV is repeated. After formation of the first image, a second blocking roller is caused to traverse the suspension with a potential of 2,500 volts applied to the blocking electrode being positive in respect to the injecting NESA glass electrode. Flood illumination is used. On completion of roller traverse, a negative yellow image made up of the remaining inert particles corresponding to the original negative black and white transparency is found adhering to the blocking electrode surface, that is black areas of the transparency are reproduced as yellow areas on the blocking electrode surface.

EXAMPLE VII

The experiment of Example I is repeated except that the inert pigment is Cyan Blue B2 a cyan dyed melamine formaldehyde resin available from Lawter Chemical, the carrier liquid is Klearol a white mineral oil available from Sonneborn Division, Witco Chemical Co. and the applied potential is 3,500 volts, the blocking electrode being positive with respect to the injecting electrode. A dense cyan positive image having a Dmax of 1.25 and a Dmin of 0.06 of the inert resin particles is formed on the blocking electrode, that is clear areas of the black and white negative transparency are reproduced as cyan areas on the paper image sheet.

EXAMPLE VIII

The experiment of Example VII is repeated except that the blocking electrode is held at a netative 3,500 volts with respect to the NESA glass injecting electrode. On completion of roller traverse, a positive cyan image made up of the photosensitive particles is found adhering to the blocking electrode.

EXAMPLE IX

The experiment of Example I is repeated except that the inert articles are Magenta 6235 a magenta dyed melamine formaldehyde resin available from Lawter Chemical Co., the carrier liquid is cottonseed oil available from Will Scientific and the blocking electrode is held at a positive 4,500 volts with respect to the injecting electrode. A positive magenta image Dmax 1.38 and Dmin 0.0 made up of the inert particles is formed on the blocking electrode.

EXAMPLE X

The experiment of Example IX is repeated except that the blocking electrode is held at a potential of a negative 4,500 volts with respect to the NESA glass surface. A positive cyan image made up of migrated photosensitive particles of the "X"-form of phthalocyanine is found adhering to the blocking electrode.

EXAMPLE XI

The experiment of Example I is repeated except that the inert particles are particles of Blue R 103-G-119 a blue dyed malamine formaldehyde resin available from Radiant Color Division of Hercules Inc. The carrier liquid is Dimethylpolysiloxane available from Dow Corning, and the blocking electrode is held at a potential of a positive 5,500 volts with respect to the injecting electrode. On completion of roller traverse, a positive Blue image of inert particles is found adhering to the blocking electrode surface.

EXAMPLE XII

The experiment of Example XI is repeated except that the blocking electrode is held at a potential of a negative 5,500 volts with respect to the injecting electrode. A positive cyan image of photosensitive particles is found adhering to the blocking electrode.

Examples XIII through XVI demonstrate how images may be made using electrically photosensitive particles which may not be sensitive enough for certain purposes.

EXAMPLE XIII

An imaging suspension is made by dispersing about 20 parts of 14-4200 Hostaperm Vat Red Violet RH Vat Violet No. 2 C.I. No. 73385 a thioindigo pigment available from Farbwerke Hoechst AG. in 100 parts of Sohio 3454. The suspension is imaged as in Example I using a potential of a positive 7,500 volts on the roller electrode and an imagewise illumination of 280 footcandles. On completion of roller traverse, a positive violet image is formed on the blocking electrode. The experiment is then repeated using an illumination of 20 footcandles. On completion of roller traverse, it is found that virtually no particles have migrated to the blocking electrode.

EXAMPLE XIV

The experiment of Example XIII is repeated except that about 1.5 parts of the "X"-form of metal-free phthalocyanine based on 20 parts of the Vat Red pigment is added to the suspension. Illumination is 20 footcandles. A violet positive image made up of the "inert" Vat Red particles is found adhering to the roller electrode.

EXAMPLE XV PRIOR ART

The experiment of Example XIII is repeated using Irgazine Red 2BLT as described in U.S. Pat. No. 2,973,358 to Geigy Chemical Corp. A magenta image is formed on the roller electrode. At 20 footcandles, a usable image is not formed.

EXAMPLE XVI

The experiment of Example XV is repeated except that about 1.5 parts of the X-form of phthalocyanine is added to the suspension. At 10 footcandles illumination, a high quality magenta image is formed on the roller electrode.

EXAMPLE XVII

The experiment of Example I is repeated except that the inert particles are about 5 micron particles of Mapico Black 7821 iron oxide available from Columbian Carbon Co. overcoated with melamine formaldehyde resin 2422 available from Radiant Color. The particles are formed by milling the dried solvent dispersion of resin and particles in an insulating vehicle of Sohio 3454. The image formed on the roller electrode made up of the resin encapsulated particles can be used as a magnetically readable member.

EXAMPLE XVIII

The experiment of Example XVII is repeated except that the inert particles are Mapico Brown 418 iron oxide available from Colombian Carbon Co. A magnetic master is formed on the roller electrode. Examples XVII and XVIII show how magnetically readable images may be formed directly from optical input.

EXAMPLE XIX

In this Example an imaging suspension is made by dispersing about one part of the "X"-form of metal-free phthalocyanine and about 6 parts of Radiant Magenta resin P1700G a magenta dyed melamine formaldehyde resin available from the Radiant Color Division of Hercules Inc. in Sohio 3454, the particles making up about 20 percent of the total weight of the imaging suspension. The suspension is coated on 3 mil Mylar available from Dupont. The 3 mil Mylar is placed on the NESA glass with the suspension on top. The roller electrode is covered with 3 mil Mylar. The inaging suspension is imaged as in Example I forming a positive magenta resin image on the roller electrode. By corona charging the surface of the suspension using a corona of about a positive 5,000 volts, the roller speed may be increased to about 30 inches per second with satisfactory images being formed.

EXAMPLE XX

The experiment of Example XIX is repeated except that the inert particles are Xerox 914 Toner as described in U.S. Pat. No. 2,891,011 to Insalaco available from the Xerox Corporation. A dense black positive image Dmax 1.6 and Dmin 0.1 is formed on the roller electrode made up of migrated toner particles.

EXAMPLE XXI

A solid imaging layer is prepared by dispersing about one part of "X"-form metal-free phthalocyanine and about 12 parts of Radiant Magenta resin P1700G the inert particle and about 10 parts of Piccotex 75 in about 50 parts of Sohio 3454. The suspension is coated on 3 mil Mylar to form a layer dry of about 7 microns. The Sohio is allowed to evaporate forming a solid imaging layer on the Mylar sheet. The Mylar is placed on the NESA glass surface with the imaging layer facing away from the NESA glass. the imaging layer is imaged as in Example I with the exception that the roller electrode is wet with sufficient Sohio 3454 to dissolve the binder allowing the particles to migrate independently. A positive magenta image is formed on the roller electrode made up of the inert particles.

EXAMPLE XXII

A solid imaging layer is formed as in Example XXI using eicosane wax in place of the Piccotex 75. At the time of imaging, the layer is heated causing the eicosane to liquify and allowing the particles to migrate. A positive magenta image made up of migrated inert particles is formed on the roller electrode.

EXAMPLE XXIII

The experiment of Example I is repeated except that the inert particles are particles of Grasol Fast Brilliant Red BL C.I. No Solvent Red 36 a spirit soluble dye available from Geigy. The dyes are coated with polyvinyl pyrrolidone as follows: A solution of 2 parts pyrrolidone and 1 part dye are dissolved in 5 parts isopropyl alcohol. The alcohol is evaporated and the resulting material milled with 20 parts Sohio 3454 to produce 2–3 micron particles. One part X-phthalocyanine is added. The dispersion is coated to a thickness of 6 microns on the electrode. The image formed on the roller electrode made up of migrated Brilliant Red BL can be used as a spirit soluble dye master.

EXAMPLE XXIV

A spirit soluble dye master is made as in Example XXIII except that the particles are Luxol Rast Black L C.I. No Solvent Black 17 available from DuPont.

EXAMPLE XXV

The experiment of Example I is repeated except that the X-form metal-free phthalocyanine particles are replaced by particles of chlorinated copper phthalocyanine available as Monarch Green VY from Imperial Color and Chemical Division, Hercules Powder Co. The illumination is 100 foot-candles. A magenta image is formed as in Example I on the roller electrode with the roller at a negative potential. Reversing the potential provides a green image on the roller electrode made up of migrated photosensitive particles.

EXAMPLE XXVI

The experiment of Example I is repeated except that the photosensitive ingredient is made up of particles of zinc oxide available as P-15 type 137 from Sylvania. A magenta image is formed using an illumination of 280 foot-candles. Reversing the roller potential provides a positive image made up of migrated zinc oxide particles.

EXAMPLE XXVII

The experiment of Example I is repeated using copper phthalocyanine Blue G.S. Toner from Holland Suco as the photosensitive ingredient. In this case the roller is held at a negative 7,500 volts with respect to the injecting electrode forming a magenta image of migrated inert particles on the roller electrode. Reversing the potential on the blocking electrode, that is by repeating the experiment using a potential of a positive 7,500 volts on the roller with respect to the injecting electrode a cyan image is formed on the roller electrode made up of migrated copper phthalocyanine.

EXAMPLE XXVIII

The experiment of Example XXVII is repeated using 1-2 micron amorphous selenium particles. Using a negatively biased roller electrode, a positive magenta image is formed on the roller electrode made up of migrated inert particles. Using a positively biased roller electrode, a positive slightly pink image is formed on the roller electrode made up of migrated selenium particles.

EXAMPLE XXIX

The experiment of Example I is repeated using Indofast Yellow Y-5743 C.I. No. 70,600 a pigment available from Harmon Color Division of National Aniline as the photosensitive ingredient. The inert particle consists of Cyan Blue B2 a blue dyed melamine formaldehyde resin from Lawter Chemical. On completion of roller traverse, a blue positive image is formed on the paper consisting of migrated inert particles. Reversing the potential on the blocking electrode, that is by repeating the experiment using a potential of a negative 7,500 volts on the roller with respect to the injecting electrode a yellow image is formed on the roller electrode made up of migrated Indofast Yellow particles.

EXAMPLE XXX

The experiment of Example XXIX is repeated except that the photosensitive pigment is Indofast Orange OV-5983 C.I. No 71105 available from Harmon Color. The results are similar to those of Example XXIX.

EXAMPLE XXXI

The experimnet of Example XXIX is repeated except that the photosensitive ingredient is Bonadur Red 20-6540 C.I. No. 15830 available from American Cyanamid Co. The results are similar to those of Example XXIX.

Although specific components and proportions have been described in the above examples, other materials as listed above, where suitable, may be used with similar results. In addition, other materials may be added to the imaging suspension to synergize, enhance or otherwise modify its properties. For example, the photosensitive particles may be dye sensitized to alter their spectral response.

Other modifications and ramifications of the present invention will occur to those skilled in the art upon a reading of the present disclosure. These are intended to be included within the scope of this invention.

What is claimed is:

1. A method of forming images from inert particles which comprises the steps of:
    a providing a layer of an imaging suspension comprising electrically photosensitive particles and inert particles dispersed in an insulating carrier liquid on a first electrode;
    b applying a potential difference across said suspension between said first electrode and a second electrode until said inert particles and said electrically photosensitive particles form a layer on said first electrode only; and
    c exposing said suspension to a pattern of radiation to which at least a portion of said electrically photosensitive particles are sensitive until an image is formed by the migration of inert particles to said second electrode, said inert particles being incapable of forming an image in response to said potential difference and said pattern of radiation when suspended alone in said carrier liquid, and said inert particles have a surface having a bulk resistivity of at least about $10^9$ ohm-cm.

2. The method of claim 1 wherein said potential difference is applied between a transparent conductive electrode and a second electrode and said pattern of radiation is directed through said transparent conductive electrode.

3. The method of claim 1 wherein said potential difference is applied between a transparent conductive electrode and a second electrode having an insulating surface in contact with said imaging suspension and said pattern of radiation is directed through said transparent conductive electrode.

4. The method of claim 1 wherein said potential difference is applied between a transparent conductive electrode having an insulating surface in contact with said imaging suspension and a second electrode having an insulating surface and said pattern of radiation is directed through said transparent conductive electrode.

5. The method of claim 1 wherein said imaging suspension is coated on the surface of an electrode and the free surface of said imaging suspension is charged prior to step (b).

6. The method of claim 1 wherein said inert particles comprise an organic material.

7. The method of claim 1 wherein said inert particles comprise an inorganic material.

8. The method of claim 1 wherein said electrically photosensitive particles comprise an organic material.

9. The method of claim 1 wherein said electrically photosensitive particles comprise an inorganic material.

10. The method of claim 1 wherein said inert particles comprise ferromagnetic materials overcoated with a resinous material.

11. The method of claim 1 wherein said particles comprise materials encapsulated in a resinous material.

12. The method of claim 1 wherein said inert particles have a surface having a bulk resistivity of at least about $10^5$ ohm cm.

13. The method of claim 1 wherein said inert particles comprise dyed thermoplastic materials.

14. The method of claim 1 wherein said inert particles comprise fluorescent materials.

15. The method of claim 1 wherein said inert particles comprise a spirit soluble dye.

15

16. The method of claim 1 wherein said inert particles and said electrically photosensitive particles are dispersed in a solid binder and the binder is liquefied prior to particle migration.

17. The method of claim 1 wherein said electrically photosensitive particles comprise selenium.

18. The method of claim 1 wherein said electrically photosensitive particles comprise phthalocyanine.

19. The method of claim 1 and further including the steps of:
d applying a potential difference across said suspension between said first electrode and a third electrode; and
e exposing said suspension to uniform radiation to which at least a portion of said electrically photosensitive particles are sensitive until an image is formed by the migration of inert particles to said third electrode.

20. The method of claim 19 wherein said electrically photosensitive particles comprise selenium.

21. A method of forming images from inert particles which comprises the steps of:
a providing a layer of an imaging suspension comprising electrically photosensitive particles and colored inert particles dispersed in an insulating carrier liquid on a first electrode;
b applying a potential difference across said suspension between said first electrode and a second electrode until said inert particles and said electrically photosensitive particles form a layer on said first electrode only; and
c exposing said suspension to a pattern of radiation to which at least a portion of said electrically photosensitive particles are sensitive until an image is formed by the migration of inert particles to said second electrode, said inert particles being incapable of forming an image in response to said potential difference and said pattern of radiation when suspended alone in said carrier liquid and said inert

16 particles have a surface having a bulk resistivity of at least about $10^3$ ohm-cm., said inert particles and said electrically photosensitive particles being up to about 15 microns in size.

22. The method of claim 21 and further including the steps of:
d applying a potential difference across said suspension between said first electrode and a third electrode; and
e exposing said suspension to uniform radiation to which at least a portion of said electrically photosensitive particles are sensitive until an image is formed by the migration of inert particles to said third electrode.

23. The method of claim 21 wherein said first electrode is transparent and conductive and said second electrode has an insulating surface in contact with the suspension and said pattern of radiation is directed through said first electrode.

24. The method of claim 21 wherein said first electrode is transparent and conductive and has an insulating surface in contact with said imaging suspension and said second electrode has an insulating surface in contact with the suspension and said pattern of radiation is directed through said first electrode.

25. The method of claim 21 wherein said imaging suspension is coated on the surface of an electrode and the free surface of said imaging suspension is charged prior to step (b).

26. The method of claim 21 wherein said inert particles have a surface having a bulk resistivity of at least about $10^5$ ohm-cm.

27. The method of claim 21 wherein said inert particles and said electrically photosensitive particles are dispersed in a solid binder and the binder is liquefied prior to particle migration.

28. The method of claim 21 wherein said electrically photosensitive particles comprise phthalocyanine.

* * * * *